(12) United States Patent
Ehret et al.

(10) Patent No.: US 6,671,605 B2
(45) Date of Patent: Dec. 30, 2003

(54) METHOD AND DEVICE FOR COORDINATING MEASURES INFLUENCING THE DRIVING PERFORMANCE OF A VEHICLE

(75) Inventors: Thomas Ehret, Moeglingen (DE); Manfred Gerdes, Oberrixingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/052,764

(22) Filed: Jan. 18, 2002

(65) Prior Publication Data

US 2002/0183913 A1 Dec. 5, 2002

(30) Foreign Application Priority Data

Jan. 18, 2001 (DE) .......................... 101 02 002

(51) Int. Cl.[7] ................................. G06F 19/00
(52) U.S. Cl. ....................... 701/70; 701/71; 701/72; 701/82; 303/146; 303/147
(58) Field of Search .................. 701/70, 71, 72, 701/74, 82, 90; 303/146, 147, 148, 149, 150, 151

(56) References Cited

U.S. PATENT DOCUMENTS

| | | | | | |
|---|---|---|---|---|---|
| 5,040,115 A | * | 8/1991 | Fukushima et al. | ........... | 701/70 |
| 5,684,700 A | * | 11/1997 | Crocker | ........... | 701/41 |
| 5,928,302 A | * | 7/1999 | Fukada | ........... | 701/70 |
| 6,226,587 B1 | * | 5/2001 | Tachihata et al. | ........... | 701/72 |

* cited by examiner

*Primary Examiner*—Marthe Y. Marc-Coleman
(74) *Attorney, Agent, or Firm*—Kenyon & Kenyon

(57) ABSTRACT

A method of coordinating a plurality of intervention measures into a driving performance of a vehicle includes determining a wheel slip angle of a front axle, determining a coefficient of friction on the front axle, determining a wheel slip angle threshold value, comparing the wheel slip angle to the wheel slip angle threshold value, and initiating a first intervention measure through at least one of a brake system of the vehicle and a drive system of the vehicle if an absolute value of the wheel slip angle is greater than an absolute value of the wheel slip angle threshold value.

8 Claims, 2 Drawing Sheets

METHOD AND DEVICE FOR COORDINATING MEASURES INFLUENCING THE DRIVING PERFORMANCE OF A VEHICLE

FIELD OF THE INVENTION

The present invention relates to a method of coordinating measures influencing the driving performance of a vehicle. The present invention also relates to a device for coordinating measures influencing the driving performance of a vehicle.

BACKGROUND INFORMATION

Various systems are known through which the driving performance of a vehicle is influenced automatically. Known systems include, for example, the anti-lock braking system (ABS) and the traction control system (TCS) which support the driver in braking and acceleration in situations that are critical from the standpoint of longitudinal dynamics. Likewise, there are also known systems which are helpful in situations that are critical from the standpoint of transverse dynamics. For example, driving dynamics regulation (FDR) and the electronic stability program (ESP) support the driver in situations that are critical from the standpoint of both longitudinal and transverse dynamics.

Furthermore, there are known systems which influence the driving performance of a vehicle through measures affecting the steering system ("dynamic steering system" (FDL)). Such a dynamic steering system also stabilizes driving performance in addition to having comfort and handling advantages, with stabilizing measures being implemented in addition to measures influencing the vehicle through other systems such as ESP. In this case, superpositioning of an additional steering angle on the front wheels is used to achieve a more comfortable stabilization (by using the measured yaw rate, a calculated yaw rate setpoint, and suitable regulator algorithms) than is possible through the ESP braking measure. Such an additional stabilization through the dynamic steering system offers special advantages, especially at high coefficients of friction.

However, in coordinating the various measures, determining suitable parameters on the basis of which it is possible to decide which measure should be taken at which time to have the best effects on the driving performance of the vehicle is problematical.

SUMMARY OF THE INVENTION

The present invention is based on the method that, due to the fact that the wheel slip angle is compared with the threshold value for the wheel slip angle, an intervention in the braking system and/or the drive system of the vehicle is implemented at an absolute wheel slip angle greater than the absolute threshold value of the wheel slip angle. Above a certain wheel slip angle, any further increase in wheel slip angle always results in progressively smaller increases in adhesion, so that regulation of the wheel slip angle by a dynamic steering system is no longer appropriate above the threshold value of the wheel slip angle. Instead, it is beneficial to perform an intervention through the brake system and/or the drive system of the vehicle, e.g., as part of ESP.

At an absolute wheel slip angle which is smaller than the absolute threshold value of the wheel slip angle, preferably no intervention is implemented through the brake system and/or the drive system of the vehicle, and instead a measure is implemented through the dynamic steering system of the vehicle. Thus the intervention measures through ESP and the dynamic steering system, for example, may be separated, and in particular no ESP intervention is performed if the regulation can be performed on the basis of the dynamic steering system alone.

It is advantageous if the wheel slip angle of the front axle is estimated on the basis of the equation $$\alpha_v = \beta + \frac{v_{Gi} \cdot l_v}{v_{Fzref}} - \delta$$

where $\alpha_v$ is the wheel slip angle
$\beta$ is the float angle (attitude angle)
$v_{Gi}$ is the yaw rate of the vehicle
$v_{Fzref}$ is the vehicle velocity
$\delta$ is the steering angle at the front axle.

The yaw rate of the vehicle may preferably be measured, while the float angle and the vehicle velocity may be estimated. Thus, a wheel slip angle $\alpha_v$ may be determined from quantities already available as part of related art systems.

It may be especially advantageous in this connection if the float angle is estimated by integration of the equation $$\frac{\partial \beta(t)}{\partial t} = \frac{a_y}{v_{Fzref}} - v_{Gi}$$

where $\beta$ is the float angle
$a_y$ is the transverse acceleration of the vehicle
$v_{Fzref}$ is the velocity of the vehicle
$v_{Gi}$ is the yaw rate of the vehicle.

Again, the yaw rate of the vehicle may be a measured quantity, and the velocity of the vehicle may be estimated. The transverse acceleration of the vehicle may also be a measured quantity. Integration of the given equation may be performed by using special algorithms and simplifying assumptions so that ultimately a vehicle float angle signal $\beta(t)$ may be obtained.

It may be especially advantageous if the coefficient of friction on the front axle is estimated on the basis of the equation $$\mu = \sqrt{a_x^2 + a_y^2}/g$$

where $\mu$ is the coefficient of friction
$a_x$ is the longitudinal acceleration of the vehicle
$a_y$ is the transverse acceleration of the vehicle
g is the acceleration due to gravity.

Acceleration due to gravity may be assumed to be equal to 9.81 m/s². The transverse acceleration of the vehicle may be measured, and the longitudinal acceleration may ultimately be estimated using the equation $$a_x = \partial v_{Fzref}/\partial t.$$

It may thus be possible to predict tire performance, so that ultimately it may be possible to estimate the threshold value of the wheel slip angle which is used as a criterion for employing the different measures intervening in the vehicle dynamics.

It may be especially advantageous that the wheel slip angle threshold value is determined as the point of intersection of two straight lines, the two lines forming tangents to the "adhesion vs. wheel slip angle" function. The first straight line may be a tangent to the point of origin and the second straight line may be a tangent to the saturation curve at a large wheel slip angle. The typical curve for "adhesion vs. wheel slip angle" at first has a constant slope of the adhesion curve at a low wheel slip angle which then flattens out at an increasing wheel slip angle and then reaches saturation. A decline in adhesion can be expected with a further increase in wheel slip angle. If one takes a straight line which forms a tangent to the function at the point of origin and also a straight line which is a tangent to the saturation range, the point of intersection of these two lines yields a wheel slip angle which is a function of the coefficient of friction. In the case of wheel slip angles larger than the wheel slip angle threshold value thus determined, an increase in the wheel slip angle results in weaker and weaker increases in adhesion.

It may be especially advantageous if, in the case of a dynamic steering system which is not active, the wheel slip angle threshold value is set at zero. In this case, activation of an intervention measure into the brake system and/or the drive system of the vehicle is made possible in every case, regardless of the prevailing coefficient of friction.

The present invention provides means for comparing the wheel slip angle with the wheel slip angle threshold value, and in the case of an absolute wheel slip angle being larger than the absolute wheel slip angle threshold value, an intervention measure is taken through the brake system and/or the drive system of the vehicle. A further increase in the wheel slip angle beyond a certain wheel slip angle leads to progressively smaller increases in adhesion, so that regulation of the wheel slip angle based on a dynamic steering system is no longer appropriate above the wheel slip angle threshold value. Instead it is beneficial to intervene through the brake system and/or the drive system of the vehicle, e.g., as part of ESP.

The present invention provides great comfort advantages obtained through the separation of the intervention measures between the brake system or the drive system of the vehicle (e.g., on the basis of ESP) and intervention measures into a dynamic steering system. Below a wheel slip angle threshold value, ESP does not usually intervene, whereas the ESP is triggered when the wheel slip angle is above the wheel slip angle threshold value, because influencing the steering angle would no longer have an effective influence on the driving performance.

DETAILED DESCRIPTION

Figure 1:
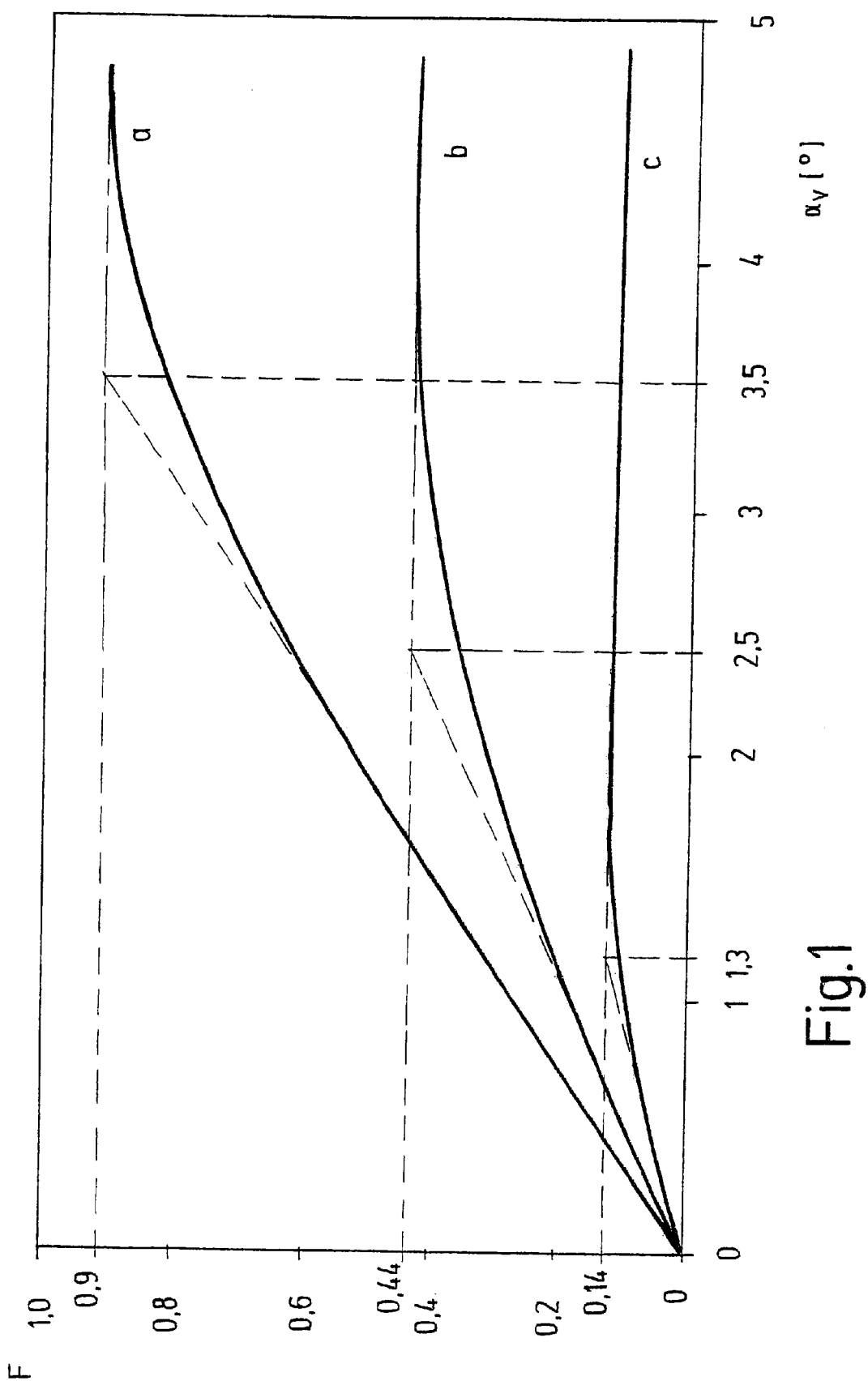
FIG. 1 shows a diagram illustrating the present invention.

FIG. 1 shows a schematic block diagram to illustrate the present invention. The diagram shows adhesion F plotted over wheel slip angle $\alpha_v$. Three different curves are plotted, curve "a" describing the performance on a dry road surface, curve "b" describing the performance on snow, and curve "c" describing the performance on ice. It can be seen that at low wheel slip angles there is a constant slope of the adhesion curve. With an increase in the wheel slip angle, the curves may flatten out, ultimately reaching saturation. With a further increase in wheel slip angle, a decline in adhesion may be expected. A wheel slip angle threshold value $\alpha_v'$ may be determined from these curves. To do so, a tangent is drawn at the origin of a curve. The other tangent is drawn at the saturation range of the curve. The point of intersection of these two tangents corresponds to wheel slip angle threshold value $\alpha_v'$, starting at which a further increase in wheel slip angle may result in progressively smaller increases in adhesion. For a dry road surface, a wheel slip angle threshold value of 3.5°, for example, is obtained. On snow, a wheel slip angle threshold value of 2.5°, for example, is obtained. On ice, a wheel slip angle threshold value of 1.3°, for example, is obtained.

Figure 2:
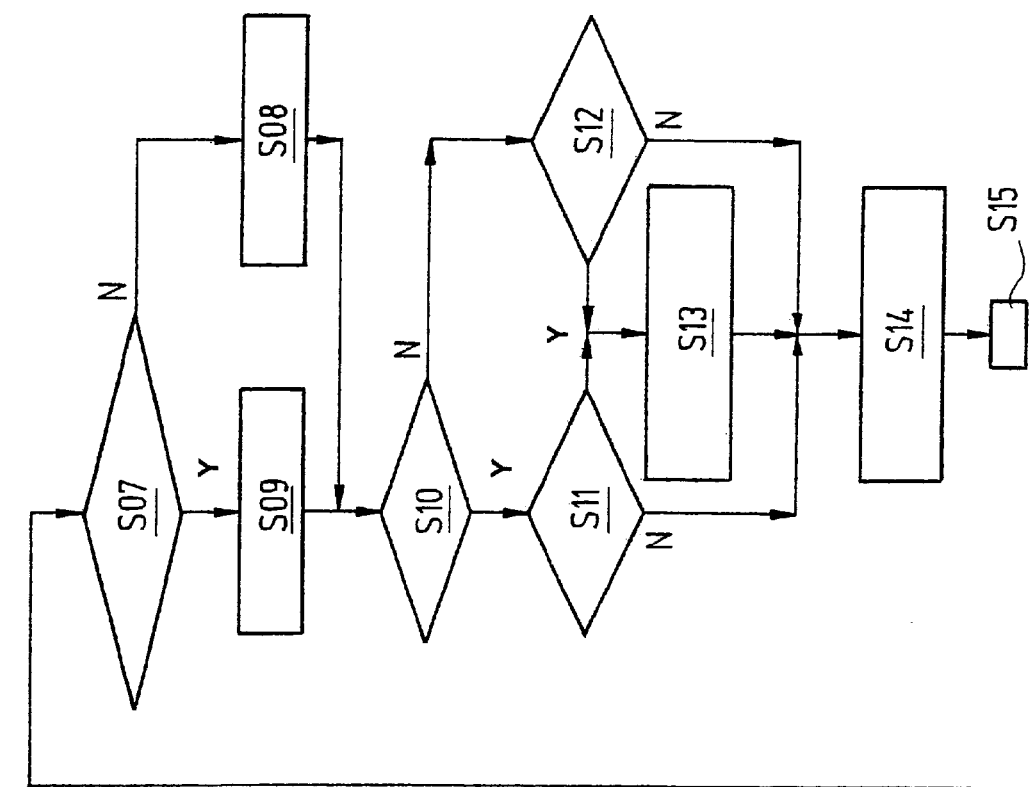
FIG. 2 shows a flow chart to illustrate the present invention.
Figure 2:
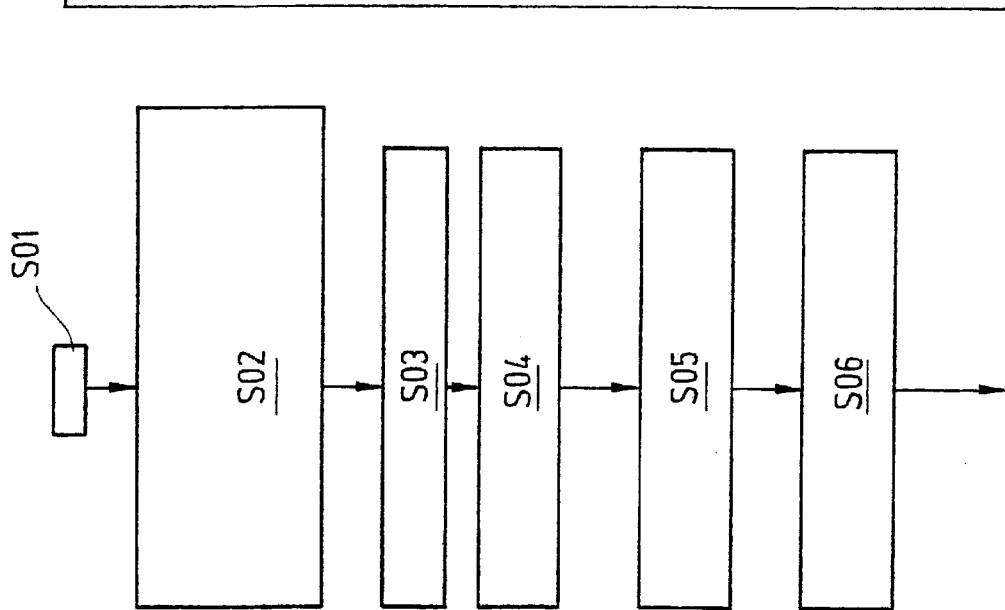

FIG. 2 shows a flow chart to illustrate the present invention. The symbols used there represent the individual steps as follows:

S01: Start

S02: Transfer of driving dynamics regulation signals, e.g., filtered steering angle; estimated vehicle float angle; estimated vehicle velocity; measured yaw rate; estimated coefficient of friction; "vehicle steering system regulation active" variable S03: Estimate of wheel slip angle, front axle S04: Set the wheel slip angle threshold value for a coefficient of friction of 0

S05: Set the wheel slip angle threshold value for a coefficient of friction of 1

S06: Determine the wheel slip angle threshold value

S07: Vehicle steering system regulation active=FALSE?

S08: Set the "vehicle steering system control reserve" variable to TRUE

S09: Set $\alpha_v'$ at 0; set the "vehicle steering system control reserve" variable to FALSE S10: $\alpha_v < 0$ S11: $\alpha_v > -\alpha_v'$ S12: $\alpha_v < \alpha_v'$ S13: Do not start the electronic stability program: set the "regulation" variable to FALSE; set the "vehicle steering system control reserve" variable to TRUE S14: Return of the vehicle dynamic regulation signals: "vehicle steering system control reserve" variable; "regulation" variable S15: End This flow chart shows, for example, a program sequence for an ESP-FLS intervention coordination which is an intervention coordination for operation as part of an electronic stability program and a dynamic steering system.

The program flow starts at step S01.

At step S02 the signals of the driving dynamics regulation are transferred to the routine. For example, this may be a filtered steering angle, an estimated vehicle float angle, an estimated vehicle velocity, a measured yaw rate and an estimated coefficient of friction. Furthermore, the "vehicle steering system regulation active variable," which may assume the values true or false, is transferred. Vehicle float angle β is estimated, for example, by integration of the equation $$\frac{\partial \beta(t)}{\partial t} = \frac{a_y}{v_{Fzref}} - v_{Gi}$$

on the basis of measured vehicle transverse acceleration $\alpha_y$, estimated vehicle velocity $v_{Fzref}$ and measured vehicle yaw rate $V_{Gi}$.

Coefficient of friction $\mu$ may be estimated according to the equation $$\mu = \sqrt{a_x^2 + a_y^2}/g$$

using the estimated longitudinal acceleration $a_x = \partial_{Fzref}/\partial_t$, measured transverse acceleration $a_y$ and the constant for acceleration due to gravity g=9.81 m/s².

In step S03 wheel slip angle $\alpha_v$ of the front axle is determined, preferably using the equation $$\alpha_v = \beta + \frac{v_{Gi} \cdot l_v}{v_{Fzref}} - \delta$$

using steering angle $\delta$ on the front axle, estimated float angle $\beta$ and the geometric distance of the front axle from the vehicle's center of gravity $l_v$.

In steps S04 and S05, the parameters for delineating control reserves that are present or not present are defined. In step S04, for example, the lowest coefficient of friction is set at a wheel slip angle of 1°. In step S05, for example the highest coefficient of friction is set at a wheel slip angle of 5°. The definition of these values is optimizable.

In step S06 wheel slip angle threshold value $\alpha_v'$ is determined by determining the point of intersection of the tangent at the origin to the "adhesion over wheel slip angle" curve (see FIG. 1) and the tangent at saturation of the "adhesion over wheel slip angle" curve.

Step S07 queries whether the vehicle steering system regulation is active by querying the "vehicle steering system regulation active" variable to determine if the value is at FALSE. If the value of the "vehicle steering system regulation active" variable does not have the value FALSE, then in step S08 the "vehicle steering system control reserve" variable is set at the value TRUE. If it is determined in step S07 that the "vehicle steering system regulation active" variable has the value FALSE, then in step S09 wheel slip angle threshold value $\alpha_v'$ is set at 0. Furthermore, the "vehicle steering system control reserve" variable is set at FALSE. In step S10, a check is performed to determine whether wheel slip angle threshold value $\alpha_v$<0. If this is the case, then in check S11 a check is performed to determine whether $\alpha_v > -\alpha_v'$. If it is found in step S10 that $\alpha_v$ is not less than 0, then step S12 queries whether $\alpha_v$ is less than $\alpha_v'$. If the queries in steps S11 or S12 are answered in the affirmative, then step S13 causes ESP not to regulate. A regulation variable is set at FALSE and the "vehicle steering system control reserve" variable is set at TRUE. Then the program sequence goes to step S14, where the driving dynamics regulation signals, i.e., the regulation variable and the "vehicle steering system control reserve" variable are returned. If the queries in steps S11 or S12 are answered in the negative, the program sequence goes directly to step S14. Consequently, the ESP may be regulated.

In step S15, ESP-FLS intervention coordination comes to an end.

The preceding description of embodiments according to the present invention is used only for illustrative purposes and should not restrict the scope of the present invention. Various alterations and modifications are possible within the scope of the present invention.

What is claimed is:

1. A method of coordinating a plurality of intervention measures into a driving performance of a vehicle, comprising the steps of:

determining a wheel slip angle of a front axle;
   determining a coefficient of friction on the front axle;
   determining a wheel slip angle threshold value;
   comparing the wheel slip angle to the wheel slip angle threshold value; and
   initiating a first intervention measure through at least one of a brake system of the vehicle and a drive system of the vehicle if an absolute value of the wheel slip angle is greater than an absolute value of the wheel slip angle threshold value;
   wherein when the absolute value of the wheel slip angle is less than the absolute value of the wheel slip angle threshold value:
      the first intervention measure through at least one of the brake system and the drive system of the vehicle is not initiated; and
      a second intervention measure through a dynamic steering system of the vehicle is initiated.

2. The method according to claim 1, further comprising the step of:
   setting the wheel slip angle threshold value to 0 if a dynamic steering system is not active.

3. A method of coordinating a plurality of intervention measures into a driving performance of a vehicle, comprising the steps of:

determining a wheel slip angle of a front axle;
   determining a coefficient of friction on the front axle;
   determining a wheel slip angle threshold value;
   comparing the wheel slip angle to the wheel slip angle threshold value; and
   initiating a first intervention measure through at least one of a brake system of the vehicle and a drive system of the vehicle if an absolute value of the wheel slip angle is greater than an absolute value of the wheel slip angle threshold value;
   wherein:
      the wheel slip angle of the front axle is determined on the basis of a first equation, the first equation being $$\alpha_v = \beta + \frac{v_{Gi} \cdot l_v}{v_{Fzref}} - \delta;$$

wherein:
      $\alpha_v$ is the wheel slip angle;
      $\beta$ is a float angle;
      $v_{Gi}$ is a yaw rate of the vehicle;
      $v_{Fzref}$ is a velocity of the vehicle; and
      $\delta$ is a steering angle at the front axle.

4. The method according to claim 3, wherein the float angle is determined by integrating a second equation, the second equation being $$\frac{\partial \beta(t)}{\partial t} = \frac{a_y}{v_{Fzref}} - v_{Gi};$$

wherein:
      $\beta$ is the float angle;
      $a_y$ is a transverse acceleration of the vehicle;
      $v_{Fzref}$ is the velocity of the vehicle; and
      $v_{Gi}$ is the yaw rate of the vehicle.

5. A method of coordinating a plurality of intervention measures into a driving performance of a vehicle, comprising the steps of:

determining a wheel slip angle of a front axle;
   determining a coefficient of friction on the front axle;

determining a wheel slip angle threshold value;

comparing the wheel slip angle to the wheel slip angle threshold value; and initiating a first intervention measure through at least one of a brake system of the vehicle and a drive system of the vehicle if an absolute value of the wheel slip angle is greater than an absolute value of the wheel slip angle threshold value;

wherein the coefficient of friction on the front axle is determined on the basis of a third equation, the third equation being $$\mu = \sqrt{a_x^2 + a_y^2}/g$$

wherein:
- $\mu$ is the coefficient of friction;
- $a_x$ is a longitudinal acceleration of the vehicle;
- $a_y$ is a transverse acceleration of the vehicle; and
- $g$ is an acceleration due to gravity.

6. A method of coordinating a plurality of intervention measures into a driving performance of a vehicle, comprising the steps of:

determining a wheel slip angle of a front axle;

determining a coefficient of friction on the front axle;

determining a wheel slip angle threshold value;

comparing the wheel slip angle to the wheel slip angle threshold value; and initiating a first intervention measure through at least one of a brake system of the vehicle and a drive system of the vehicle if an absolute value of the wheel slip angle is greater than an absolute value of the wheel slip angle threshold value;

wherein:
  the wheel slip angle threshold value is determined as an intersection point of a first straight line and a second straight line, each of the first and second straight lines being tangents to a function of adhesion versus wheel slip angle; and
  the first straight line being a first tangent at an origin point, and the second line being a second tangent to a saturation characteristic for a large wheel slip angle.

7. A device for coordinating intervention measures into a driving performance of a vehicle, comprising:

an arrangement for determining a wheel slip angle of a front axle;

an arrangement for determining a coefficient of friction on the front axle;

an arrangement for determining a wheel slip angle threshold value;

an arrangement for comparing the wheel slip angle to the wheel slip angle threshold value; and an arrangement for initiating, when an absolute value of the wheel slip angle is greater than an absolute value of the wheel slip angle threshold value, a first intervention measure through at least one of a brake system of the vehicle and a drive system of the vehicle;

wherein the arrangement for initiated is configured so that when the absolute value of the wheel slip angle is less than the absolute value of the wheel slip angle threshold value:
  the first intervention measure through at least one of the brake system and the drive system of the vehicle is not initiated; and
  a second intervention measure through a dynamic steering system of the vehicle is initiated.

8. A device for coordinating intervention measures into a driving performance of a vehicle, comprising:

an arrangement configured to determine a wheel slip angle of a front axle;

an arrangement configured to determine a coefficient of friction on the front axle;

an arrangement configured to determine a wheel slip angle threshold value;

an arrangement configured to compare the wheel slip angle to the wheel slip angle threshold value; and an arrangement configured to initiate, when an absolute value of the wheel slip angle is greater than an absolute value of the wheel slip angle threshold value, a first intervention measure through at least one of a brake system of the vehicle and a drive system of the vehicle;

wherein the arrangement configured to initiate is configured so that when the absolute value of the wheel slip angle is less than the absolute value of the wheel slip angle threshold value:
  the first intervention measure through at least one of the brake system and the drive system of the vehicle is not initiated; and
  a second intervention measure through a dynamic steering system of the vehicle is initiated.

* * * * *

UNITED STATES PATENT AND TRADEMARK OFFICE
CERTIFICATE OF CORRECTION

PATENT NO. : 6,671,605 B2
DATED : December 30, 2003
INVENTOR(S) : Ehret et al.

It is certified that error appears in the above-identified patent and that said Letters Patent is hereby corrected as shown below:

Column 5,
Line 3, change "$\mu = \sqrt{a_x^2 + a_y^2} / g$" to -- $\mu = \sqrt{a_x^2 + a_y^2} / g$ --

Signed and Sealed this

Seventeenth Day of August, 2004

JON W. DUDAS
*Acting Director of the United States Patent and Trademark Office*